(12) United States Patent
Holt et al.

(10) Patent No.: US 10,591,625 B2
(45) Date of Patent: Mar. 17, 2020

(54) METHOD, SYSTEM, AND MEDIUM FOR CONTROLLING RATE OF PENETRATION OF A DRILL BIT

(71) Applicant: PASON SYSTEMS CORP., Calgary (CA)

(72) Inventors: Trevor Leigh Holt, Calgary (CA); Thomas William Charles Wilson, Calgary (CA); Quinn Harrison Hepburn, Calgary (CA)

(73) Assignee: PASON SYSTEMS CORP., Calgary (CA)

( * ) Notice: Subject to any disclaimer, the term of this patent is extended or adjusted under 35 U.S.C. 154(b) by 191 days.

(21) Appl. No.: 15/592,562

(22) Filed: May 11, 2017

(65) Prior Publication Data

US 2017/0328193 A1      Nov. 16, 2017

Related U.S. Application Data

(60) Provisional application No. 62/336,494, filed on May 13, 2016.

(51) Int. Cl.
*G01V 3/00* (2006.01)
*G05B 19/406* (2006.01)
(Continued)

(52) U.S. Cl.
CPC ............... *G01V 3/00* (2013.01); *E21B 12/02* (2013.01); *E21B 7/00* (2013.01); *E21B 21/08* (2013.01);
(Continued)

(58) Field of Classification Search
None
See application file for complete search history.

(56) References Cited

U.S. PATENT DOCUMENTS 3,029,951 A    4/1962    Cannon
3,265,359 A    8/1966    Bowden
(Continued)

FOREIGN PATENT DOCUMENTS

CA          2536945 A1      8/2017

OTHER PUBLICATIONS

"Automatic Driller" Pason Systems, Jun. 27, 2015, retrieved from the internet at <http://web.archive.org/web/20150629075217/http://www.pason.com:80/rigsite/automaticdriller> on May 9, 2017.
(Continued)

*Primary Examiner* — Ramesh B Patel
(74) *Attorney, Agent, or Firm* — Katten Muchin Rosenman LLP (57) ABSTRACT

Methods, systems, and techniques for controlling the rate of penetration of a drill bit use drilling parameter measurements read from drilling parameter sensors to evaluate control loops, with the output of one of the control loops at any given time being used by an automatic driller to control the rate of penetration. For each of the drilling parameters, the automatic driller reads a drilling parameter measurement, determines an error measurement that represents a difference between a drilling parameter setpoint and the drilling parameter measurement, and from the error measurement determines an output signal proportional to the rate of penetration of the drill bit. The output signal of one of the control loops is subsequently selected and used to control the rate of penetration.

20 Claims, 5 Drawing Sheets

(51) Int. Cl.
*E21B 12/02* (2006.01)
*E21B 41/00* (2006.01)
*E21B 21/08* (2006.01)
*E21B 7/00* (2006.01)
*E21B 44/06* (2006.01)
*E21B 44/04* (2006.01)
*E21B 44/02* (2006.01)

(52) U.S. Cl.
CPC ............. *E21B 41/00* (2013.01); *E21B 44/04* (2013.01); *E21B 44/06* (2013.01); *G05B 19/406* (2013.01)

(56) References Cited

U.S. PATENT DOCUMENTS

| | | | | |
|---|---|---|---|---|
| 3,777,560 | A * | 12/1973 | Guignard | E21B 45/00 340/853.6 |
| 3,815,673 | A * | 6/1974 | Bruce | E21B 7/128 166/359 |
| 3,842,347 | A * | 10/1974 | Terbrack | G01P 3/489 324/76.61 |
| 3,881,695 | A * | 5/1975 | Joubert | E21B 19/09 166/355 |
| 3,931,735 | A * | 1/1976 | Guigmard | E21B 19/09 73/152.45 |
| 4,354,233 | A * | 10/1982 | Zhukovsky | E21B 44/00 173/6 |
| 4,662,608 | A | 5/1987 | Ball | |
| 4,843,875 | A | 7/1989 | Kerbart | |
| 5,474,142 | A | 12/1995 | Bowden | |
| 5,713,422 | A * | 2/1998 | Dhindsa | E21B 19/08 173/4 |
| 5,842,149 | A * | 11/1998 | Harrell | E21B 44/00 702/9 |
| 5,927,408 | A | 7/1999 | Dummer | |
| 6,021,377 | A * | 2/2000 | Dubinsky | E21B 7/068 702/9 |
| 6,026,912 | A | 2/2000 | King et al. | |
| 6,029,951 | A | 2/2000 | Guggari | |
| 6,152,246 | A | 11/2000 | King et al. | |
| 6,206,108 | B1 * | 3/2001 | MacDonald | E21B 44/00 175/24 |
| 6,293,356 | B1 | 9/2001 | King et al. | |
| 6,382,331 | B1 | 5/2002 | Pinckard | |
| 6,944,547 | B2 | 9/2005 | Womer et al. | |
| 6,994,172 | B2 | 2/2006 | Ray | |
| 7,095,427 | B2 | 8/2006 | Goto | |
| 7,100,708 | B2 | 9/2006 | Koederitz | |
| 7,537,066 | B1 | 5/2009 | Flud et al. | |
| 7,775,297 | B2 * | 8/2010 | Hopwood | E21B 44/00 175/24 |
| 7,857,075 | B2 | 12/2010 | Jeffryes | |
| 8,136,609 | B2 * | 3/2012 | Hopwood | E21B 44/00 175/24 |
| 8,256,534 | B2 * | 9/2012 | Byreddy | E21B 44/00 175/27 |
| 8,274,399 | B2 * | 9/2012 | Strachan | G05B 13/048 340/853.6 |
| 8,453,764 | B2 * | 6/2013 | Turner | G05B 13/048 175/70 |
| 8,527,249 | B2 | 9/2013 | Jamison et al. | |
| 8,602,126 | B2 | 12/2013 | Boone et al. | |
| 8,636,086 | B2 | 1/2014 | Hbaieb | |
| 8,843,220 | B1 | 9/2014 | Rembach et al. | |
| 2008/0135290 | A1 * | 6/2008 | Hopwood | E21B 44/00 175/24 |
| 2010/0300753 | A1 * | 12/2010 | Hopwood | E21B 44/00 175/24 |
| 2015/0053482 | A1 | 2/2015 | Boone | |
| 2015/0252664 | A1 | 9/2015 | Astrid | |
| 2015/0308253 | A1 | 10/2015 | Clark et al. | |
| 2015/0369031 | A1 | 12/2015 | Yang et al. | |
| 2016/0024905 | A1 | 1/2016 | Johnson et al. | |
| 2016/0047219 | A1 | 2/2016 | Jeffryes | |
| 2016/0053603 | A1 | 2/2016 | Israel et al. | |
| 2016/0053604 | A1 | 2/2016 | Abbassian et al. | |

OTHER PUBLICATIONS

Office Action for Canadian Patent Application No. 2,930,320 dated Feb. 26, 2019.

* cited by examiner

METHOD, SYSTEM, AND MEDIUM FOR CONTROLLING RATE OF PENETRATION OF A DRILL BIT

This application claims the benefit of U.S. Patent Appln. No. 62/336,494, filed May 13, 2016 the contents of which is incorporated herein by reference.

TECHNICAL FIELD

The present disclosure is directed at methods, systems, and techniques for controlling rate of penetration of a drill bit.

BACKGROUND

During oil and gas drilling, a drill bit located at the end of a drill string is rotated into and through a formation to drill a well. The rate of penetration of the drill bit through the formation reflects how quickly the well is being drilled. Generally, it is unadvisable to blindly increase drilling parameters such as weight-on-bit or drill string torque in an attempt to increase the rate of penetration; doing so may cause the drilling process to catastrophically fail.

To safely and efficiently drill wells, an automatic driller may be used. Automatic drillers attempt to control the rate of penetration of the drill bit by taking into account one or more drilling parameters.

SUMMARY

According to a first aspect, there is provided a method for controlling rate of penetration of a drill bit. The method comprises, for each of multiple drilling parameters, evaluating a control loop by (i) reading a drilling parameter measurement; (ii) determining an error measurement that represents a difference between a drilling parameter setpoint and the drilling parameter measurement; and (iii) determining, from the error measurement, an output signal proportional to the rate of penetration of the drill bit. The method further comprises selecting the output signal of one of the control loops to control the rate of penetration; and using the output signal that is selected to control the rate of penetration.

Determining of the output signal may comprise adding a proportional component that varies proportionally with the error measurement and an integral component that varies with a sum of previous error measurements.

Selecting the output signal may comprise determining which of the control loops has the output signal of lowest magnitude, and selecting the output signal of lowest magnitude to control the rate of penetration.

Selecting the output signal may comprise determining which of the control loops has the error measurement that represents a lowest percentage error relative to the drilling parameter setpoint, and selecting the output signal of the control loop that has the lowest percentage error to control the rate of penetration.

Using the output signal that is selected to control the rate of penetration of the drill bit may comprise sending the output signal that is selected to a variable frequency drive that controls a drawworks of an oil rig.

Using the output signal that is selected to control the rate of penetration of the drill bit may comprise controlling a hydraulics system that controls the height of a traveling block, or a drawworks comprising brakes that are used to control the descent of the traveling block.

The method may further comprise, for each of the control loops whose output signal is not used to control the rate of penetration of the drill bit, adjusting the integral component used to determine the output signal such that the output signal is approximately equal to the output signal that is selected.

Determining the output signal may further comprise adding a derivative component to the proportional component and the integral component, and the derivative component may vary with a rate of change versus time of the error measurement.

The drilling parameters may comprise at least one of weight-on-bit, differential pressure, torque applied to a drill string to which the drill bit is coupled, and traveling block velocity.

According to another aspect, there is provided a system for controlling rate of penetration of a drill bit. The system comprises a processor and a non-transitory computer readable medium communicatively coupled to the processor. The medium has stored thereon computer program code that is executable by the processor. The computer program code when executed by the processor causes the processor to, for each of multiple drilling parameters, evaluate a control loop by (1) reading a drilling parameter measurement; (2) determining an error measurement that represents a difference between a drilling parameter setpoint and the drilling parameter measurement; and (3) determining, from the error measurement, an output signal proportional to the rate of penetration of the drill bit. The computer program code also causes the processor to select the output signal of one of the control loops to control the rate of penetration; and use the output signal that is selected to control the rate of penetration.

To determine the output signal, the processor adds a proportional component that varies proportionally with the error measurement and an integral component that varies with a sum of previous error measurements.

Selecting the output signal may comprise determining which of the control loops has the output signal of lowest magnitude, and selecting the output signal of lowest magnitude to control the rate of penetration.

Selecting the output signal may comprise determining which of the control loops has the error measurement that represents a lowest percentage error relative to the drilling parameter setpoint, and selecting the output signal of the control loop that has the lowest percentage error to control the rate of penetration.

The system may further comprise a drawworks communicatively coupled to the processor, and the output signal that is selected may be sent to the drawworks to adjust the rate of penetration of the drill bit.

The system may further comprise a hydraulics system communicatively coupled to the processor that controls the height of a traveling block, or a drawworks communicatively coupled to the processor that comprises brakes that are used to control the descent of the traveling block.

For each of the control loops whose output signal is not used to control the rate of penetration of the drill bit, the computer program code may cause the processor to adjust the integral component of the output signal such that the output signal is approximately equal to the output signal that is selected.

Determining the output signal may comprises adding a derivative component to the proportional component and the integral component, and the derivative component may vary with a rate of change versus time of the error measurement.

The system may further comprise a hookload sensor communicatively coupled to the processor, wherein obtaining the drilling parameter measurement for one of the drilling parameters comprises reading a measurement from the weight-on-bit sensor; a standpipe sensor communicatively coupled to the processor, wherein obtaining the drilling parameter measurement for one of the drilling parameters comprises reading a measurement from the standpipe sensor; a torque sensor communicatively coupled to the processor, wherein obtaining the drilling parameter measurement for one of the drilling parameters comprises obtaining a torque measurement from the torque sensor; and a block height sensor communicatively coupled to the processor, wherein obtaining the drilling parameter measurement for one of the drilling parameters comprises reading block height measurements from the traveling block velocity sensor.

According to another aspect, there is provided a system for controlling rate of penetration of a drill bit. The system comprises drilling parameter sensors; and an automatic driller communicatively coupled to each of the drilling parameter sensors to determine drilling parameter measurements from sensor readings. The automatic driller is configured to, for each of multiple drilling parameters corresponding to the drilling parameter measurements, evaluate a control loop by (1) reading a drilling parameter measurement; (2) determining an error measurement that represents a difference between a drilling parameter setpoint and the drilling parameter measurement; and (3) determining, from the error measurement, an output signal proportional to the rate of penetration of the drill bit. The automatic driller is also configured to select the output signal of one of the control loops to control the rate of penetration; and use the output signal that is selected to control the rate of penetration.

20. A non-transitory computer readable medium having stored thereon computer program code that is executable by a processor, and which when executed by the processor causes the processor to perform any of the foregoing aspects of the method and suitable combinations thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

During well drilling, multiple sensors may be used to monitor various drilling parameters, such as weight-on-bit ("WOB"), torque applied to the drill string, rate of penetration, and differential pressure. Those sensors may be communicative with an automatic driller that uses those sensor measurements to control the rate of penetration of the drill string. The embodiments described herein are directed at methods, systems, and techniques to control the rate of penetration of the drill string by evaluating multiple control loops, with each of the control loops corresponding to a particular drilling parameter. For example, in an embodiment in which one of the monitored drilling parameters is WOB, the control loop corresponding to WOB compares a setpoint for WOB to a measured WOB, and from the error between the setpoint and the measured WOB uses a proportional-integral ("PI") or proportional-integral-derivative ("PID") control technique to determine an output signal that may be used to control the rate of penetration of the drill string. One of the output signals of the control loops is selected and used to control the rate of penetration. For example, in one embodiment the different output signals determined by the control loops corresponding to different drilling parameters are compared to each other, and the lowest output signal is used to control the rate of penetration. Operating in this manner helps to ensure that none of the drilling parameters substantially exceeds their setpoints.

In certain embodiments, when control of the rate of penetration is transferred from one of the control loops to another, the transfer is done so as to be perceived to be smooth, or continuous, by a driller. For example, when the output signal of one of the control loops is selected to be the signal that controls rate of penetration, the output signals of the remaining control loops may be adjusted to be substantially identical to the selected output signal; when PI or PID control loops are used, this may be done by adjusting the value of the integral component of those control loops.

Figure 1:
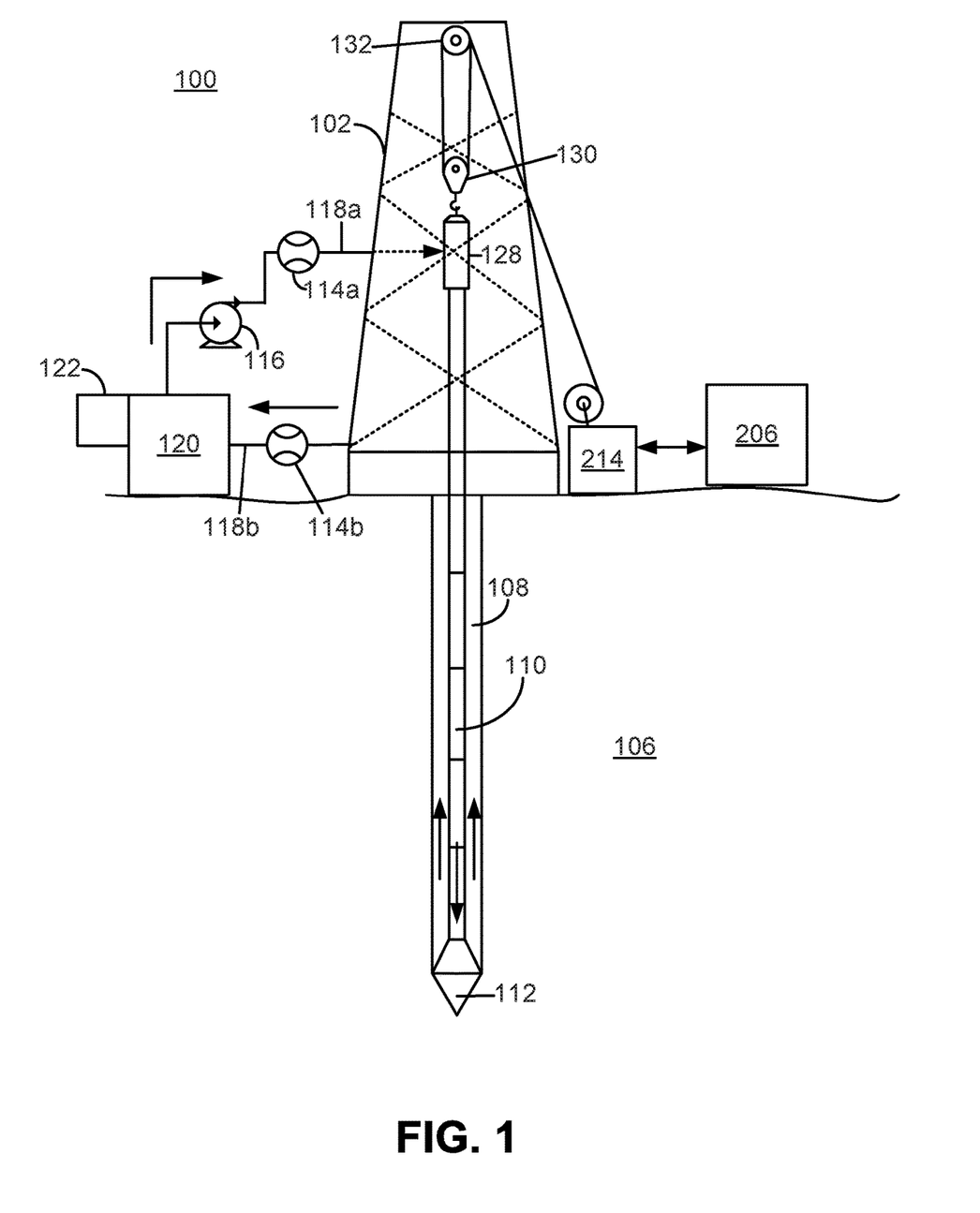
FIG. 1 depicts an oil rig that is being used to drill a well in conjunction with an automatic driller, according to one example embodiment.

Referring now to FIG. 1, there is shown an oil rig that is being used to drill a well in conjunction with an automatic driller 206, which comprises part of an example system for controlling the rate of penetration of a drill bit. The rig comprises a derrick 102 from which downwardly extends into a formation 106 a drill string 110 at the end of which is a drill bit 112. Mounted to the derrick 102 are a crown block 132 and a traveling block 130 that is movable by means of a pulley system relative to the crown block 132. A top drive 128 is attached to the bottom of the traveling block 130 via a hook and connects the traveling block 130 to the drill string 110. The top drive 128 provides the torque and consequent rotary force used to rotate the drill string 110 through the formation 106. A drawworks 214 is at the base of the rig and comprises a pulley system that connects the drawworks 214 to the crown block 132 and that enables the drawworks 214 to vertically translate the traveling block 128 relative to the crown block 132. By actuating its pulley, the drawworks 214 is accordingly able to apply vertical forces to the drill string 110 and adjust its rate of penetration. While the drill string 110 in the depicted embodiment is rotatably powered by the top drive 128, in different embodiments (not depicted) the top drive 128 may be replaced with a swivel, rotary table and kelly. Rotation of the drill bit 112 through the formation 106 drills a well 108.

A reservoir 120 for drilling fluid (hereinafter interchangeably referred to as a "mud tank 120" or "mud pit 120") stores drilling fluid for pumping into the well 108 via the drill string 110. A volume meter 122 is affixed to the mud tank 120 and is used to measure the total volume of the drilling fluid stored in the mud tank 120 at any particular time (this volume is hereinafter interchangeably referred to as "pit volume"). A closed fluid circuit comprises the mud tank 120, a fluid input line 118a for sending the drilling fluid down the interior of the drill string 110 via the top drive 128 and subsequently into the annulus between the drill string 110 and the annular surface of the well 108, and a fluid return line 118b for returning the drilling fluid from that annulus to the mud tank 120; the direction of drilling fluid flow along this closed fluid circuit is shown by arrows in FIG. 1. A mud pump 116 is fluidly coupled to and located along the fluid input line 118a and is used to pump the drilling fluid from the mud tank 120 into the drill string 110. An input flow meter 114a and a return flow meter 114b are fluidly coupled to and located along the fluid input line 118a and fluid return line 118b, respectively, and are used to monitor flow rates into and out of the well 108. A driller's cabin and doghouse are not shown in FIG. 1, but in certain embodiments are also present at the rigsite and are discussed in respect of FIG. 2, below.

As used herein, the rate of penetration of the drill string 110, the drum speed of the drawworks 214, and the speed of the traveling block 130 are all directly proportional to each other and are effectively used interchangeably for simplicity.

The rig also comprises various sensors (depicted in FIG. 2), such as a hookload sensor 222, standpipe pressure sensor 220, torque sensor 218, and block height sensor 216, as discussed in more detail below. As discussed in further detail below, sensor readings are sent to the automatic driller 206 and are used to facilitate control of the rate of penetration of the drill bit 112 by the automatic driller 206.

Figure 2:
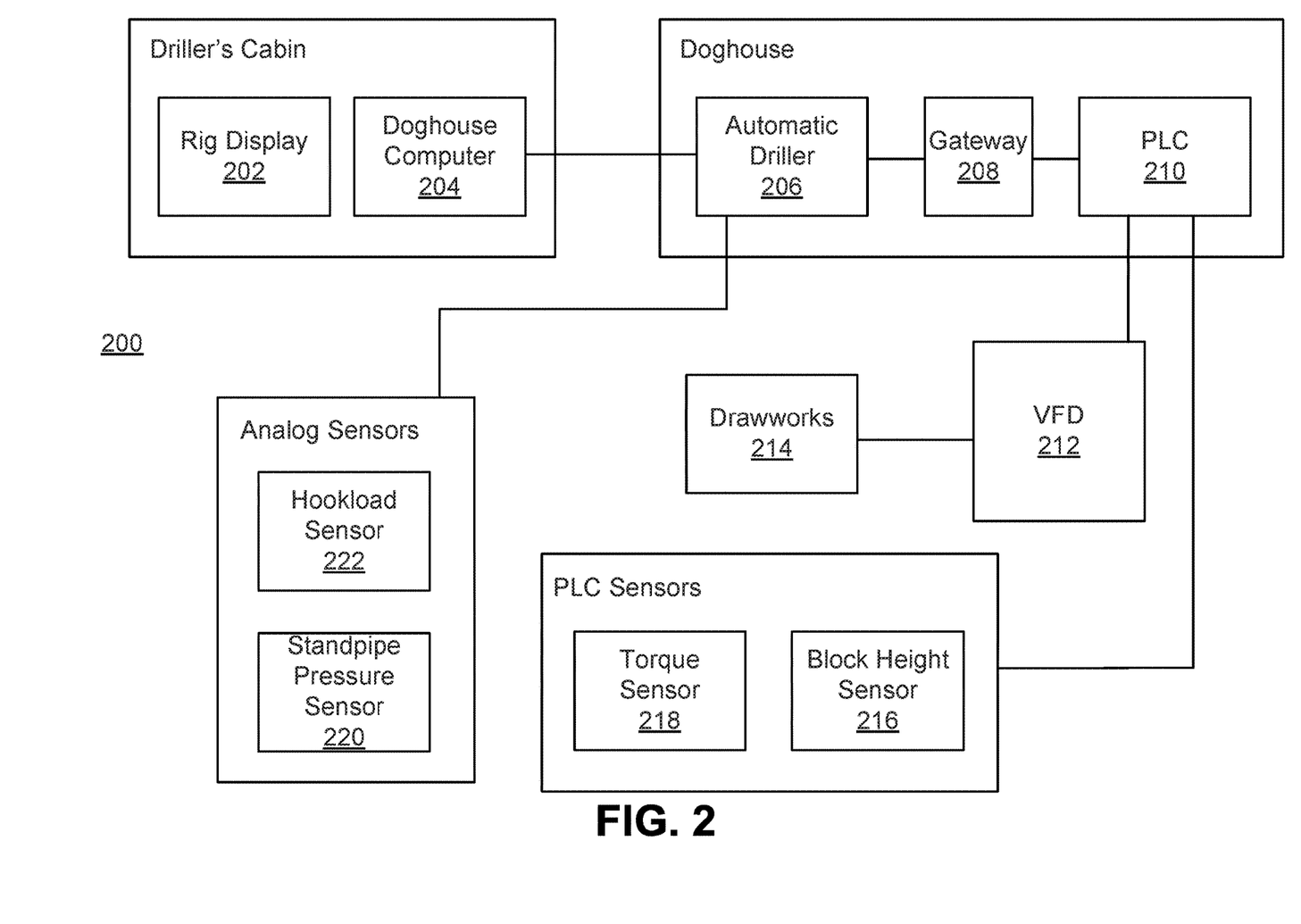
FIG. 2 depicts a block diagram of an embodiment of a system for controlling the rate of penetration of a drill bit and that comprises the automatic driller of FIG. 1.
Figure 3:
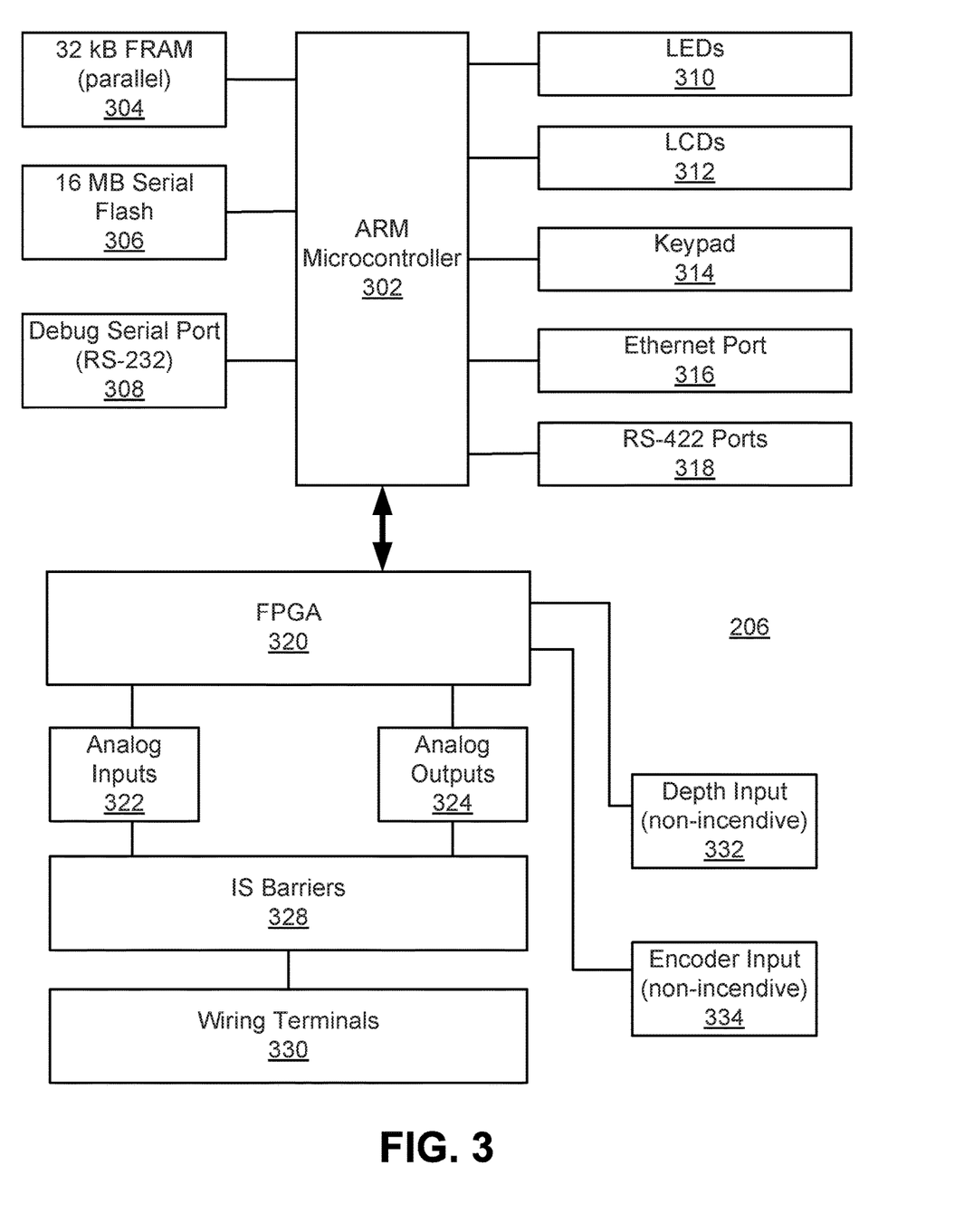
FIG. 3 depicts a block diagram of the automatic driller of FIG. 1.

Referring now to FIG. 2, there is shown a hardware block diagram 200 of the embodiment of the system 100 of FIG. 1. An automatic driller 206, which is shown in more detail in FIG. 3, is present in the doghouse and is configured to perform a method for controlling the rate of penetration of a drill bit, as described in more detail below. An example automatic driller that may be modified to perform the method is the Automatic Driller™ offered by Pason Systems Corp.™ The automatic driller 206 is communicatively coupled to a doghouse computer 204 and a rig display 202 in a driller's cabin; the doghouse computer 204 and rig display 202 each permit a driller to interface with the automatic driller 206 by, for example, setting drilling parameter setpoints and obtaining drilling parameter measurements. The rig display 202 may be, for example, the Rig Display™ offered by Pason Systems Corp.™

The automatic driller 206 is located within a doghouse and transmits and receives analog signals and indirectly transmits and receives digital signals. The automatic driller 206 is directly communicatively coupled to a hookload sensor 222 and a standpipe pressure sensor 220, which the automatic driller 206 uses to obtain WOB and differential pressure measurements, respectively. Each of the hookload and pressure sensors 222,220 sends an analog signal directly to the automatic driller 206. The automatic driller 206 is indirectly communicatively coupled to a torque sensor 218 and a block height sensor 216 that digitally transmit measurements indicating the amount of torque applied to a drill string 110 by, for example, the top drive 128, and the height of the traveling blocks. These digital measurements are sent to a programmable logic controller ("PLC") 210 in the doghouse. The automatic driller 206 is also coupled via the PLC 210 to a variable frequency drive ("VFD") 212, which is used to control the drum speed of a drawworks 214. The drawworks 214 is used to adjust the height of the traveling blocks of the rig. An example VFD is a Yaskawa™ A1000 VFD, and an example PLC is a Siemens™ SIMATIC™ S7 series PLC. The PLC 210 transmits those signals to the automatic driller 206 via a gateway 208.

In other embodiments (not depicted), the automatic driller 206 may communicate with equipment via only a digital interface, only an analog interface, or communicate with a different combination of analog and digital interfaces than that shown in FIG. 2. For example, in one different embodiment (not depicted) the automatic driller 206 communicates using an analog interface with all of the sensors 216,218, 220,222. In another different embodiment (not depicted), the automatic driller 206 communicates using a digital interface (e.g., via the PLC 210) to all of the sensors 216,218,220,222. In another different embodiment (not depicted), the automatic driller 206 may directly control the drawworks 214 or VFD 212 without using the PLC 210 as an intermediary.

Referring now to FIG. 3, there is shown a hardware block diagram 300 of the automatic driller 206 of FIG. 2. The automatic driller 206 comprises a microcontroller 302 communicatively coupled to a field programmable gate array ("FPGA") 320. The depicted microcontroller 302 is an ARM based microcontroller, although in different embodiments (not depicted) the microcontroller 302 may use a different architecture. The microcontroller 302 is communicatively coupled to 32 kB of non-volatile random access memory ("RAM") in the form of ferroelectric RAM 304; 16 MB of flash memory 306; a serial port 308 used for debugging purposes; LEDs 310, LCDs 312, and a keypad 314 to permit a driller to interface with the automatic driller 206; and communication ports in the form of an Ethernet port 316 and RS-422 ports 318. While FIG. 3 shows the microcontroller 302 in combination with the FPGA 320, in different embodiments (not depicted) different hardware may be used. For example, the microcontroller 302 may be used to perform the functionality of both the FPGA 320 and microcontroller 302 in FIG. 3; alternatively, a PLC may be used in place of one or both of the microcontroller 302 and the FPGA 320.

The microcontroller 302 communicates with the hookload and standpipe pressure sensors 222,220 via the FPGA 320. More specifically, the FPGA 320 receives signals from these sensors 222,220 as analog inputs 322; the FPGA 320 is also able to send analog signals using analog outputs 324. These inputs 322 and outputs 324 are routed through intrinsic safety ("IS") barriers for safety purposes, and through wiring terminals 330. The microcontroller 302 communicates using the RS-422 ports 318 to the gateway 208 and the PLC 210; accordingly, the microcontroller 302 receives signals from the block height and torque sensors 216,218 and sends signals to the VFD 212 via the RS-422 ports 318.

The FPGA 320 is also communicatively coupled to a non-incendive depth input 332 and a non-incendive encoder input 334. In different embodiments (not depicted), the automatic driller 206 may receive different sensor readings in addition to or as an alternative to the readings obtained using the depicted sensors 216,218,220,222.

Figure 4:
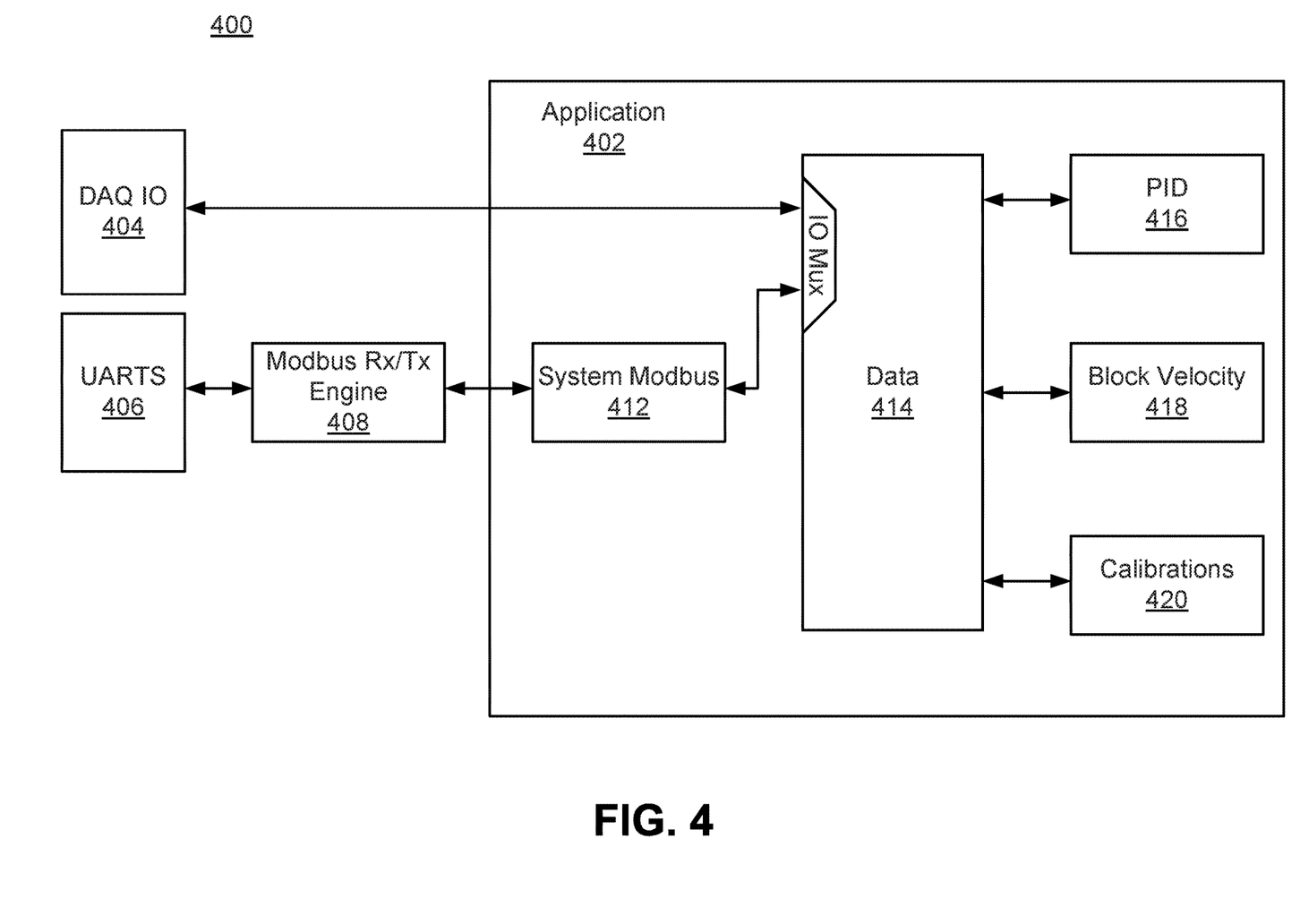
FIG. 4 depicts a block diagram of software modules running on the automatic driller of FIG. 1.

Referring now to FIG. 4, there is shown a block diagram of software modules, some of which comprise a software application 402, running on the automatic driller of FIG. 3. The application 402 comprises a data module 414 that is communicative with a PID module 416, a block velocity module 418, and a calibrations module 420. As discussed in further detail below, the microcontroller 302 runs multiple PID control loops in order to determine the signal to send to the PLC 210 to control the VFD 212; the microcontroller 302 does this in the PID module 416. The microcontroller 302 uses the block velocity module 418 to determine the velocity of the traveling block 130 from the traveling block height derived using measurements from the block height sensor 216. The microcontroller 302 uses the calibrations module 420 to convert the electrical signals received from the sensors 216,218,220,222 into engineering units; for example, to convert a current signal from mA into kilopounds.

The data module 414 also communicates using an input/output multiplexer, labeled "IO Mux" in FIG. 4. In one of the multiplexer states the data module 414 communicates digitally via the Modbus protocol using the system modbus 412 module, which is communicative with a Modbus receive/transmit engine 408 and the UARTS 406. In another of the multiplexer states, the data module 414 communicates analog data directly using the data acquisition in/out module 404. While in FIG. 4 the Modbus protocol is shown as being used, in different embodiments (not depicted) a different protocol may be used, such as another suitable industrial bus communication protocol.

Figure 5:
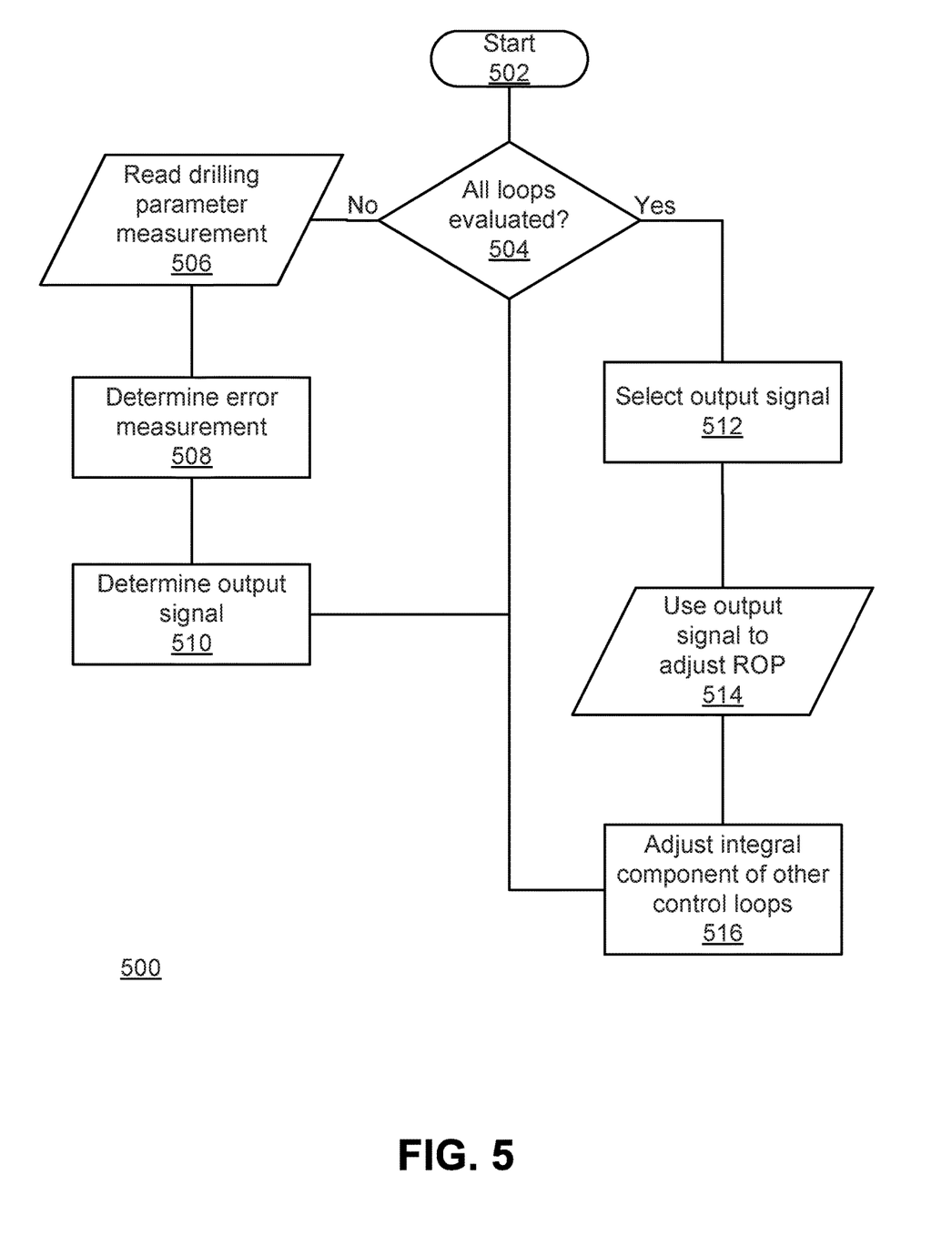
FIG. 5 depicts a method for controlling the rate of penetration of a drill bit, according to another example embodiment.

Referring now to FIG. 5, there is shown a method 500 for controlling the rate of penetration of a drill bit, according to another example embodiment. The method 500 may be encoded as computer program code and stored on to the flash memory 306. The computer program code is executable by the microcontroller 302 and, when executed by the microcontroller 302, causes the microcontroller 302 and consequently the automatic driller 206 to perform the method 500 of FIG. 5.

In FIG. 5, the microcontroller 302 receives a reading from the hookload sensor 222 from which it determines a WOB measurement; a reading from the standpipe pressure sensor 220 from which it determines a differential pressure (i.e., a pressure difference between the standpipe pressure and the standpipe pressure as measured when the drill bit 112 is off bottom) measurement; a reading from the torque sensor 218 from which it determines a torque measurement of torque applied to the drill string 110 by the top drive 128 or in one different embodiment a rotary table; and a reading from the block height sensor 216 from which it determines traveling block velocity. The microcontroller 302 determines a traveling block velocity measurement by time indexing the traveling block height measurements and dividing changes in the block height measurements over time in the block velocity module 418. As discussed in further detail below, by performing the method 500 the microcontroller 302 is able to keep all of WOB, torque, traveling block velocity, and rate of penetration substantially at or below a desired setpoint. In the depicted embodiment, the microcontroller 302 operates four PID control loops (each a "control loop") using the PID module 416. Each of the control loops receives as input one of the drilling parameter measurements (e.g., the WOB measurement, the differential pressure measurement, the torque measurement, and the traveling block velocity measurement) and outputs a signal that may be used to adjust the rate of penetration of the drill string 110. In the depicted embodiment, the output signal for any one of the control loops comprises the sum of a proportional component, an integral component, and a derivative component. The proportional component comprises the product of a proportional gain and an error measurement that represents a difference between a drilling parameter setpoint and the drilling parameter measurement; the integral component comprises the product of an integral gain and the sum of previous error measurements; and the derivative component comprises the product of a derivative gain and the rate of change of the error measurement. While in the depicted embodiment the control loops use all of the proportional, integral, and derivative components, in different embodiments (not depicted), any one or more of the control loops may comprise only the proportional and integral components, or be of a non-PI or PID type.

In the method 500 of FIG. 5, the microcontroller 302 evaluates each of the control loops once and in sequence for each of the drilling parameters before deciding whether to adjust the output signal sent to the VFD 212. Accordingly, the microcontroller 302 at block 504 determines if, for a particular iteration of the method 500, the control loops corresponding to each of WOB, differential pressure, traveling block velocity, and torque have been evaluated. If not, the microcontroller 302 proceeds to block 506 where it begins to evaluate one of the control loops.

At block 506, the microcontroller 302 obtains a drilling parameter measurement of the drilling parameter associated with the control loop being evaluated. For example, if the microcontroller 302 is evaluating the control loop for WOB, the microcontroller 302 reads the hookload sensor 222 and from it determines the WOB measurement. After reading the drilling parameter measurement at block 506, the microcontroller 302 proceeds to block 508 where it determines an error measurement that represents a difference between a drilling parameter setpoint and the drilling parameter measurement. After determining the error measurement, the microcontroller 302 evaluates the control loop to determine the control loop's output signal. The microcontroller 302 does this by evaluating Equation (1):

$$\text{Output Signal} = K_p e(t) + K_i \int_0^t e(\tau)d\tau + K_d \frac{de(t)}{dt} \quad (1)$$

Equation (1) is an equation for evaluating a PID control loop in a continuous time domain; alternatively, the microcontroller 302 may evaluate any one or more of the control loops, or any one or more terms of any one or more of the control loops, in the discrete time domain.

Once the microcontroller 302 determines the output signal for the control loop at block 510, it returns to block 504. If any control loops remain unevaluated for the current iteration of the method 500, the microcontroller 302 performs blocks 506, 508, and 510 again to evaluate one of the unevaluated control loops. If the microcontroller 302 has evaluated all of the control loops for the current iteration of the method 500, the microcontroller 302 proceeds to block 512.

In FIG. 5, for any particular iteration of the method 500 the microcontroller 302 evaluates each of the control loops once and in sequence. In different embodiments (not depicted), however, the microcontroller 302 may evaluate the control loops differently. For example, the microcontroller 302 may evaluate any one or more of the control loops in parallel before proceeding to block 512. Additionally or alternatively, the microcontroller 302 may evaluate any one or more of the control loops in a separate thread and rely on interrupts to determine when to perform blocks 512 to 516.

When the microcontroller 302 arrives at block 512, it selects which of the control loops to use to control the rate of penetration of the drill bit 112. In the depicted embodiment, the microcontroller 302 does this by sending the output signal of lowest magnitude to the PLC 210 via the gateway 208, and the PLC 210 relays the output signal to the VFD 212. The VFD 212 in turn adjusts the drawworks 214, which raises and lowers the traveling block and consequently the drill string 110. In different embodiments (not depicted), however, the microcontroller 302 may be used to control rigs that adjust the drill string 110 using equipment other than the drawworks 214 and VFD 212. For example, the drawworks 214 and VFD 212 may be replaced with alternative equipment such as a hydraulics system to raise and lower the traveling block 130 and a drawworks with brakes, such as band or disc brakes, with the brakes being used to control the downward movement of the traveling block 130. In the depicted embodiment the output signal may vary, for example, between 0 mA and 20 mA, with 0 mA corresponding to a rate of penetration of 0 m/hr and 20 mA corresponding to a rate of penetration of 400 to 500 m/hr.

As described above, the microcontroller 302 selects the output signal of lowest magnitude to control the rate of penetration. However, in different embodiments the microcontroller 302 may select the output signal by applying a different rule or set of rules. For example, in one different embodiment the microcontroller 302 determines which of the control loops has the error measurement that is the lowest percentage error relative to the drilling parameter setpoint for that control loop, and then uses the output signal for that control loop to control the rate of penetration. In another different embodiment, a combination of multiple selection methods may be used to select the output signal that is used.

The microcontroller 302 subsequently proceeds to block 516 where it adjusts the integral component of the output signals of the control loops that are not used to adjust the drill string's 110 ROP so that those output signals are approximately, and in certain embodiments exactly, equal to the output signal of lowest magnitude used to adjust the ROP. For example, if the output of the WOB control loop is the lowest of the outputs of the control loops and is sent to the PLC 210 and subsequently to the VFD 212 at block 514, at block 516 the microcontroller 302 adjusts the integral component of each of the differential pressure, torque, and traveling block velocity control loops such that their outputs equals the output of the WOB control loop. In certain embodiments, the integral component may be negative to account for a relatively high proportional component, derivative component, or both. Adjusting the integral component in this fashion facilitates a relatively continuous transfer of control from one control loop to another.

While the microcontroller 302 is used in the foregoing embodiments, in different embodiments (not depicted) the microcontroller 302 may instead be, for example, a microprocessor, processor, controller, programmable logic controller, field programmable gate array, or an application-specific integrated circuit. Examples of computer readable media are non-transitory and include disc-based media such as CD-ROMs and DVDs, magnetic media such as hard drives and other forms of magnetic disk storage, and semiconductor based media such as flash media, SSDs, random access memory, and read only memory. Additionally, for the sake of convenience, the example embodiments above are described as various interconnected functional blocks. This is not necessary, however, and there may be cases where these functional blocks are equivalently aggregated into a single logic device, program or operation with unclear boundaries. In any event, the functional blocks can be implemented by themselves, or in combination with other pieces of hardware or software.

FIG. 5 is a flowchart of an example embodiment of a method. Some of the blocks illustrated in the flowchart may be performed in an order other than that which is described. Also, it should be appreciated that not all of the blocks described in the flowchart are required to be performed, that additional blocks may be added, and that some of the illustrated blocks may be substituted with other blocks.

As used herein, the terms "approximately" and "about" when used in conjunction with a value mean+/−20% of that value.

Directional terms such as "top", "bottom", "upwards", "downwards", "vertically", and "laterally" are used in this disclosure for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this disclosure are intended to include indirect and direct connections unless otherwise indicated. For example, if a first article is coupled to a second article, that coupling may be through a direct connection or through an indirect connection via another article. As another example, when two articles are "communicatively coupled" to each other, they may communicate with each other directly or indirectly via another article. Furthermore, the singular forms "a", "an", and "the" as used in this disclosure are intended to include the plural forms as well, unless the context clearly indicates otherwise.

It is contemplated that any part of any aspect or embodiment discussed in this specification can be implemented or combined with any part of any other aspect or embodiment discussed in this specification.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A method for controlling a rate of penetration of a drill bit, the method comprising:
   (a) evaluating with an automatic driller a control loop, for each of multiple drilling parameters, wherein each drilling parameter is associated with a corresponding drilling parameter setpoint, by:
      (i) reading a drilling parameter measurement by using a drilling parameter sensor;
      (ii) determining an error measurement that represents a difference between the drilling parameter setpoint associated with the drilling parameter and the read drilling parameter measurement; and
      (iii) determining, from the error measurement, an output signal proportional to the rate of penetration of the drill bit;
   (b) after evaluating each of the control loops, selecting from among the multiple evaluated control loops, the determined output signal of only one of the control loops; and
   (c) using the output signal that is selected to control the rate of penetration of the drill bit.

2. The method of claim 1 wherein the determining of the output signal comprises adding a proportional component that varies proportionally with the error measurement and an integral component that varies with a sum of previous error measurements.

3. The method of claim 2 further comprising, for each of the control loops whose output signal is not used to control the rate of penetration of the drill bit, adjusting the integral component used to determine the output signal such that the output signal is approximately equal to the output signal that is selected.

4. The method of claim 2 wherein determining the output signal further comprises adding a derivative component to the proportional component and the integral component, and wherein the derivative component varies with a rate of change versus time of the error measurement.

5. The method of claim 1 wherein selecting the determined output signal comprises determining which of the control loops has the output signal of lowest magnitude, and selecting the output signal of lowest magnitude to control the rate of penetration.

6. The method of claim 1 wherein selecting the determined output signal comprises determining which of the control loops has the error measurement that represents a lowest percentage error relative to the drilling parameter setpoint, and selecting the output signal of the control loop that has the lowest percentage error to control the rate of penetration.

7. The method of any one of claim 1, wherein using the output signal that is selected to control the rate of penetration of the drill bit comprises sending the output signal that is selected to a variable frequency drive that controls a drawworks of an oil rig.

8. The method of claim 1 wherein using the output signal that is selected to control the rate of penetration of the drill bit comprises controlling a hydraulics system that controls the height of a traveling block, or a drawworks comprising brakes that are used to control the descent of the traveling block.

9. The method of claim 1 wherein the drilling parameters comprise at least one of weight-on-bit, differential pressure, torque applied to a drill string to which the drill bit is coupled, and traveling block velocity.

10. A system for controlling a rate of penetration of a drill bit, the system comprising:
(a) a processor;
(b) a non-transitory computer readable medium communicatively coupled to the processor and having stored thereon computer program code that is executable by the processor, wherein the computer program code when executed by the processor causes the processor to:
(i) evaluate a control loop, for each of multiple drilling parameters, wherein each drilling parameter is associated with a corresponding drilling parameter setpoint, by:
(1) obtaining a drilling parameter measurement by using a drilling parameter sensor;
(2) determining an error measurement that represents a difference between the drilling parameter setpoint associated with the drilling parameter and the obtained drilling parameter measurement; and
(3) determining, from the error measurement, an output signal proportional to the rate of penetration of the drill bit;
(ii) after evaluating each of the control loops, select, from among the multiple evaluated control loops, the determined output signal of only one of the control loops; and
(iii) use the output signal that is selected to control the rate of penetration of the drill bit.

11. The system of claim 10 wherein to determine the output signal, the processor adds a proportional component that varies proportionally with the error measurement and an integral component that varies with a sum of previous error measurements.

12. The system of claim 11 wherein, for each of the control loops whose output signal is not used to control the rate of penetration of the drill bit, computer program code causes the processor to adjust the integral component of the output signal such that the output signal is approximately equal to the output signal that is selected.

13. The system of claim 11 wherein determining the output signal comprises adding a derivative component to the proportional component and the integral component, and wherein the derivative component varies with a rate of change versus time of the error measurement.

14. The system of claim 10 wherein selecting the determined output signal comprises determining which of the control loops has the output signal of lowest magnitude, and selecting the output signal of lowest magnitude to control the rate of penetration.

15. The system of claim 10 wherein selecting the determined output signal comprises determining which of the control loops has the error measurement that represents a lowest percentage error relative to the drilling parameter setpoint, and selecting the output signal of the control loop that has the lowest percentage error to control the rate of penetration.

16. The system of claim 10 further comprising a drawworks communicatively coupled to the processor, and wherein the output signal that is selected is sent to the drawworks to adjust the rate of penetration of the drill bit.

17. The system of claim 10 further comprising a hydraulics system communicatively coupled to the processor that controls the height of a traveling block, or a drawworks communicatively coupled to the processor and comprising brakes that are used to control the descent of the traveling block.

18. The system of claim 10 further comprising:
(a) a hookload sensor communicatively coupled to the processor, wherein obtaining the drilling parameter measurement for one of the drilling parameters comprises reading a measurement from the hookload sensor;
(b) a standpipe sensor communicatively coupled to the processor, wherein obtaining the drilling parameter measurement for one of the drilling parameters comprises reading a measurement from the standpipe sensor;
(c) a torque sensor communicatively coupled to the processor, wherein obtaining the drilling parameter measurement for one of the drilling parameters comprises obtaining a torque measurement from the torque sensor; and
(d) a block height sensor communicatively coupled to the processor, wherein obtaining the drilling parameter measurement for one of the drilling parameters comprises reading block height measurements from the traveling block velocity sensor.

19. A system for controlling a rate of penetration of a drill bit, the system comprising:
(a) drilling parameter sensors; and
(b) an automatic driller communicatively coupled to each of the drilling parameter sensors to determine drilling parameter measurements from sensor readings, wherein the automatic driller is configured to:
(i) evaluating a control loop, for each of multiple drilling parameters corresponding to the drilling parameter measurements, wherein each drilling parameter is associated with a corresponding drilling parameter setpoint, by:
(1) reading a drilling parameter measurement;
(2) determining an error measurement that represents a difference between the drilling parameter setpoint associated with the drilling parameter and the read drilling parameter measurement; and (3) determining, from the error measurement, an output signal proportional to the rate of penetration of the drill bit;

(ii) after evaluating each of the control loops, select, from among the multiple evaluated control loops, the determined output signal of only one of the control loops; and (iii) use the output signal that is selected to control the rate of penetration of the drill bit.

20. A non-transitory computer readable medium having stored thereon computer program code that is executable by a processor, and which when executed by the processor causes the processor to perform a method for controlling a rate of penetration of a drill bit, the method comprising:

(a) evaluating a control loop, for each of multiple drilling parameters, wherein each drilling parameter is associated with a corresponding drilling parameter setpoint, by:

(i) reading a drilling parameter measurement by using a drilling parameter sensor;

(ii) determining an error measurement that represents a difference between the drilling parameter setpoint associated with the drilling parameter and the read drilling parameter measurement; and (iii) determining, from the error measurement, an output signal proportional to the rate of penetration of the drill bit;

(b) (after evaluating each of the control loops, selecting, from among the multiple evaluated control loops, the determined output signal of only one of the control loops; and (c) using the output signal that is selected to control the rate of penetration of the drill bit.

* * * * *